US010493680B2

(12) United States Patent
Takii et al.

(10) Patent No.: US 10,493,680 B2
(45) Date of Patent: Dec. 3, 2019

(54) TEMPERATURE CONTROL METHOD AND TEMPERATURE CONTROL DEVICE

(71) Applicant: U-MHI PLATECH CO., LTD., Nagoya-shi, Aichi (JP)

(72) Inventors: Takashi Takii, Aichi (JP); Yasuhiro Kai, Aichi (JP)

(73) Assignee: U-MHI PLATECH CO., LTD., Aichi (JP)

( * ) Notice: Subject to any disclaimer, the term of this patent is extended or adjusted under 35 U.S.C. 154(b) by 381 days.

(21) Appl. No.: 15/529,494

(22) PCT Filed: Nov. 25, 2015

(86) PCT No.: PCT/JP2015/005850
§ 371 (c)(1),
(2) Date: May 24, 2017

(87) PCT Pub. No.: WO2016/084369
PCT Pub. Date: Jun. 2, 2016

(65) Prior Publication Data
US 2017/0274573 A1 Sep. 28, 2017

(30) Foreign Application Priority Data

Nov. 26, 2014 (JP) ................................. 2014-238856

(51) Int. Cl.
*B29C 45/78* (2006.01)
*B29C 45/62* (2006.01)
*B29C 45/74* (2006.01)
*G05D 23/19* (2006.01)
*G05D 23/32* (2006.01)

(52) U.S. Cl.
CPC .............. *B29C 45/78* (2013.01); *B29C 45/62* (2013.01); *B29C 45/74* (2013.01);
(Continued)

(58) Field of Classification Search
CPC .......... B29C 45/78; B29C 2945/76043; B29C 2945/76518; B29C 2945/76521; B29C 2945/76525
See application file for complete search history.

(56) References Cited

U.S. PATENT DOCUMENTS 4,272,466 A * 6/1981 Harris ....................... B29B 7/42
264/40.6
4,902,454 A * 2/1990 Steinbichler ........ B29C 45/7306
264/328.16
(Continued)

FOREIGN PATENT DOCUMENTS

JP 2003-25404 A 1/2003
JP 2003-114724 A 4/2003
(Continued)

OTHER PUBLICATIONS

International Search Report in International Patent Application No. PCT/JP2015/005850, dated Jan. 12, 2016.
(Continued)

*Primary Examiner* — Atul P. Khare
(74) *Attorney, Agent, or Firm* — Kanesaka Berner and Partners LLP

(57) ABSTRACT

A temperature control method includes: a step of obtaining, by means of PID control, a first energization rate based on a first temperature difference between an actually measured temperature and a target temperature; a step of obtaining a second energization rate based on a second temperature difference between the ambient temperature of the environment in which a heating barrel is disposed and the target temperature; a step of obtaining a corrected energization rate on the basis of the result of comparison of the first energization rate and the second energization rate; and a step of controlling the electrical power to be supplied to a heater on the basis of the corrected energization rate. The corrected energization rate is set to any of predetermined first, second, and third conditions on the basis of the comparison result.

6 Claims, 4 Drawing Sheets

(52) U.S. Cl.
CPC .. *G05D 23/1919* (2013.01); *B29C 2945/7619* (2013.01); *B29C 2945/76043* (2013.01); *B29C 2945/76518* (2013.01); *B29C 2945/76521* (2013.01); *B29C 2945/76525* (2013.01); *B29C 2945/76668* (2013.01); *B29C 2945/76969* (2013.01)

(56) References Cited

U.S. PATENT DOCUMENTS

| | | | | |
|---|---|---|---|---|
| 5,149,193 | A * | 9/1992 | Faillace | B29C 48/83 366/145 |
| 5,452,999 | A * | 9/1995 | Evans | B29C 45/73 165/263 |
| 5,456,870 | A * | 10/1995 | Bulgrin | B29C 45/76 264/211.21 |
| 2008/0039969 | A1 * | 2/2008 | Liu | B22D 17/32 700/197 |

FOREIGN PATENT DOCUMENTS

| | | |
|---|---|---|
| JP | 3402740 B2 | 5/2003 |
| JP | 2007-41947 A | 2/2007 |
| JP | 2011-79222 A | 4/2011 |

OTHER PUBLICATIONS

Written Opinion in International Patent Application No. PCT/JP2015/005850, dated Jan. 12, 2016.

* cited by examiner

TEMPERATURE CONTROL METHOD AND TEMPERATURE CONTROL DEVICE

RELATED APPLICATIONS

The present application is a national phase of International Application Number PCT/JP2015/005850, filed Nov. 25, 2015, which claims priority to Japanese Application Number 2014-238856, filed Nov. 26, 2014.

TECHNICAL FIELD

The present invention relates to a temperature control method that is suitable to heat heating targets, such as a heating barrel of an injection molding machine, with heaters.

BACKGROUND ART

In injection molding machines, conditions for the temperature control of a heating barrel are one of important management elements that influences the quality of resin molding products to be obtained. The temperature control of this heating barrel is performed by feedback control on the basis of proportional integral derivative control (PID control), as described in, for example, PTLs 1 and 2. Incidentally, PTLs 1 and 2 suggest that temperature control adapted to a thermal state change of a temperature control system can be performed by switching PID parameters at the time of an operation step of an injection molding machine and switching of a state.

CITATION LIST

Patent Literature

[PTL 1] Japanese Unexamined Patent Application Publication No. 2003-25404
[PTL 2] Japanese Unexamined Patent Application Publication No. 2011-79222

SUMMARY OF INVENTION

Technical Problem

The energy (heat) to be supplied to heaters is lost, mainly, due to heat release to an environment around the injection molding machine, and the control of the heater is greatly influenced by the amount of this heat loss. Meanwhile, since the amount of heat that is generally released to the surrounding environment from the heaters is approximately proportional to a temperature difference between heater temperature and an environmental ambient temperature, a heater control command value (energization rate) is substantially determined uniquely with respect to the environmental ambient temperature, and the repeatability thereof is also high. For this reason, in environments in which the fluctuation of the environmental ambient temperature is little, the amount of electrical power to be applied may not be controlled by always re-calculating an energization rate, a current value, a voltage value, and the like by means of feedback control or the like, but heater control may be performed by experientially obtaining electrical energy (the resistance value of a resistor) by means of trial and error using a variable resistor or the like and fixing this electrical energy. According to this control, it is not possible to cope with disturbances, such as changes in temperature in the morning, during the day, during the night, and the like, and a room temperature change caused by turning on and off of an air-conditioner that adjusts the temperature of a room, and there is a concern that heater temperature may deviate from a target temperature.

Additionally, generally, in the PID control, it is necessary to take a temperature history into consideration regarding an integrated value (I control value=cumulative value of temperature differences in predetermined period) and an offset value (offset value of output formula for calculating energization rate to heaters) as parameters for stably controlling temperature. Hence, after a time point (for example, 2 hours after) when a predetermined time has elapsed, the feedback control (PID calculation) in the same temperature control period calculates an optimum value for the first time at that time point. For this reason, even in a case where the environmental ambient temperature has changed in the PID control, the re-calculated PID parameters are reflected on control at the time point when the predetermined time has elapsed. Therefore, overshoot or undershoot in a case where the environmental ambient temperature has changed is apt to occur, or long time is required until the overshoot or undershoot converges.

Thus, an object of the invention is to provide a temperature control method and a temperature control device capable of causing the heating temperature by a heater to quickly converge to a target temperature in accordance with an environmental ambient temperature.

Solution to Problem

The temperature control method of the invention based on this object heats a heating target with a heater, detects the temperature of the heating target, and controls electrical power to be supplied to the heater by means of a feedback control system including PID control such that a detected, actually measured temperature Ta reaches a preset target temperature Ts, and includes the following configuration.

That is, the invention includes a step (A) of obtaining, by means of the PID control, a first energization rate y1 based on a first temperature difference e1 between the actually measured temperature Ta and the target temperature Ts; a step (B) of obtaining a second energization rate y2 based on a second temperature difference e2 between an ambient temperature Te of an environment in which the heating target is disposed and the target temperature Ts; a step (C) of obtaining a corrected energization rate y on the basis of a comparison result of the first energization rate y1 and the second energization rate y2; and a step (D) of controlling the electrical power to be supplied to the heater on the basis of the corrected energization rate y.

In the present invention, in the step (C), the corrected energization rate y is set to any of the following first, second, and third conditions on the basis of the comparison result.

$y = y1$            First condition:

$y = y2 - \alpha1$            Second condition:

$y = y2 + \beta1$            Third condition:

Here, $\alpha1$ and $\beta1$ are respectively predetermined management allowable values that are set in advance and consist of positive numbers.

The corrected energization rate y
is set to the first condition in the case of $y2 - \alpha1 \leq y1 \leq y2 + \beta1$,
is set to the second condition in the case of $y1 < y2 - \alpha1$, and
is set to the third condition in the case of $y2 + \beta1 < y1$.

In the temperature control method of the invention, it is possible to reach the target temperature early by means of the PID control, the second energization rate y2 is based on the second temperature difference e2 between the ambient temperature Te and the target temperature Ts, and adapts to the environmental ambient temperature Te of the heating target. Hence, the temperature control method can cause the temperature of the heater to quickly converge to the target temperature Ts with high precision by adopting the corrected energization rate y obtained on the basis of the result of the comparison result between the first energization rate y1 and the second energization rate y2.

In the step (B) of the temperature control method of the invention, it is preferable that the second energization rate y2 is obtained on the basis of previously acquired correlation data of a temperature difference e2n between an environmental ambient temperature Ten and the target temperature Tsn and an energization rate required to solve the temperature difference e2n.

In this way, since the calculation processing time when calculating the second energization rate y2 is shortened by using the correlation data that is obtained in advance, the temperature of the heater can be made to more quickly converge to the target temperature Ts.

Additionally, the invention includes a step (a) of obtaining a first integral quantity I1 based on a first temperature difference e1 between the actually measured temperature Ta and the target temperature Ts when a corrected integral quantity I of the PID control is obtained; a step (b) of obtaining a second integral quantity I2 based on a second temperature difference e2 between an ambient temperature Te of an environment in which the heating target is disposed and the target temperature Ts; a step (c) of obtaining the corrected integral quantity I on the basis of a result of comparison of the first integral quantity I1 and the second integral quantity I2; a step (d) of obtaining a corrected energization rate y using the corrected integral quantity I; and a step (e) of controlling the electrical power to be supplied to the heater on the basis of the corrected energization rate y.

In the present invention, in the step (c), the corrected integral quantity I is obtained by applying limitation with the second integral quantity I2, with the first integral quantity I1 as a reference, and the corrected integral quantity I is set to any of the following first, second, and third conditions on the basis of the comparison result.

$I=I1$      First condition:

$I=I2-\alpha 2$      Second condition:

$I=I2+\beta 2$      Third condition:

Here, $\alpha 2$ and $\beta 2$ are respectively predetermined management allowable values that are set in advance and consist of positive numbers.

The corrected integral quantity I
is set to the first condition in the case of $I2-\alpha 2 \leq I1 \leq I2+\beta 2$,
is set to the second condition in the case of $I1<I2-\alpha 2$, and
is set to the third condition in the case of $I2+\beta 2<I1$.

Although the heating target in the temperature control method of the invention is arbitrary, the temperature of a heating barrel can be made to precisely and quickly converge to the target temperature if the heating target is the heating barrel of the injection molding machine. Accordingly, the quality of resin molding products to be obtained can be guaranteed.

Additionally, the temperature control device of the invention heats a heating target with a heater, detects the temperature of the heating target, and controls electrical power to be supplied to the heater by means of a feedback control system including PID control such that a detected, actually measured temperature Ta reaches a preset target temperature Ts, and includes the following configuration.

The temperature control device of the invention includes a reference energization rate calculation unit that creates, by means of the PID control, a first energization rate y1 based on a first temperature difference e1 between the actually measured temperature Ta and the target temperature Ts; an interpolation calculation unit that creates a second energization rate y2 based on a second temperature difference e2 between an ambient temperature Te of an environment in which the heating target is disposed and the target temperature Ts; a comparison calculation unit that obtains a corrected energization rate y on the basis of a result of comparison of the first energization rate y1 and the second energization rate y2; and an operation amount processing unit that controls the electrical power to be supplied to the heater on the basis of the corrected energization rate y obtained by the comparison calculation unit.

The comparison calculation unit of the invention sets the corrected energization rate y to any of the following first, second, and third conditions on the basis of the comparison result.

$y=y1$      First condition:

$y=y2-\alpha 1$      Second condition:

$y=y2+\beta 1$      Third condition:

Here, $\alpha 1$ and $\beta 1$ are respectively predetermined management allowable values that are set in advance and consist of positive numbers.

The corrected energization rate y
is set to the first condition in the case of $y2-\alpha 1 \leq y1 \leq y2+\beta 1$,
is set to the second condition in the case of $y1<y2-\alpha 1$, and
is set to the third condition in the case of $y2+\beta 1<y1$.

In the temperature control device of the invention, it is possible to reach the target temperature early by means of the PID control, the second energization rate y2 serving as a limiting value in the derivation of the corrected energization rate y is based on the second temperature difference e2 between the ambient temperature Te and the target temperature Ts, and adapts to the environmental ambient temperature Te of the heating target. Hence, the temperature control device can cause the temperature of the heater to quickly converge to the target temperature Ts with high precision even in a case where the environmental ambient temperature Te of the heating target has fluctuated by adopting the corrected energization rate y obtained on the basis of the result of the comparison result between the first energization rate y1 and the second energization rate y2.

The temperature control device according to the invention further includes a storage unit that stores previously acquired correlation data of a temperature difference e2n between an environmental ambient temperature Ten and the target temperature Tsn and an energization rate required to solve the temperature difference e2n, and the interpolation calculation unit can obtain the second energization rate y2 on the basis of he ambient temperature Te and the correlation data acquired from the storage unit.

In this way, since the calculation processing time when calculating the second energization rate y2 is shortened by using the correlation data that is obtained in advance, the temperature of the heater can be made to more precisely and quickly converge to the target temperature Ts. Accordingly, the quality of resin molding products to be obtained can be guaranteed.

Additionally, a temperature control device of the invention includes a reference integral quantity calculation unit that creates a first integral quantity I1 based on a first temperature difference e1 between the actually measured temperature Ta and the target temperature Ts when a corrected integral quantity I of the PID control is obtained; an interpolation calculation unit that creates a second integral quantity I2 based on a second temperature difference e2 between an ambient temperature Te of an environment in which the heating target is disposed and the target temperature Ts; a comparison calculation unit that obtains the corrected integral quantity I on the basis of a result of comparison of the first integral quantity I1 and the second integral quantity I2; an energization rate calculation unit that obtains a corrected energization rate y on the basis of the corrected integral quantity I obtained by the comparison calculation unit; and an operation amount processing unit that controls the electrical power to be supplied to the heater on the basis of the corrected energization rate y.

The comparison calculation unit according to the invention obtains the corrected integral quantity I by applying limitation with the second integral quantity I2, with the first integral quantity I1 as a reference, and sets the corrected integral quantity I to any of the following first, second, and third conditions on the basis of the comparison result.

$I=I1$ First condition:

$I=I2-\alpha 2$ Second condition:

$I=I2+\beta 2$ Third condition:

Here, $\alpha 2$ and $\beta 2$ are respectively predetermined management allowable values that are set in advance and consist of positive numbers.

The corrected integral quantity I
is set to the first condition in the case of $I2-\alpha 2 \leq I1 \leq I2+\beta 2$,
is set to the second condition in the case of $I1<I2-\alpha 2$, and
is set to the third condition in the case of $I2+\beta 2<I1$.

Although the heating target in the temperature control device of the invention is arbitrary, the temperature of a heating barrel can be made to precisely and quickly converge to the target temperature if the heating target is the heating barrel of the injection molding machine. Accordingly, the quality of resin molding products to be obtained can be guaranteed.

Advantageous Effects of Invention

According to the temperature control of the invention, since the first energization rate y1 is obtained by means of the PID control, the control for quick approximation of the heating temperature to the target temperature is possible, and since the second energization rate y2 serving as a limiting value when obtaining the corrected energization rate y adapts to the environmental ambient temperature Te of the heating target, the temperature of the heater can be made to quickly converge to the target temperature Ts with high precision even in a case where the environmental ambient temperature Te of the heating target has fluctuated.

DESCRIPTION OF EMBODIMENTS

Hereinafter, preferred embodiments of the invention will be described in detail with reference to the accompanying drawings.

First Embodiment

Figure 1:
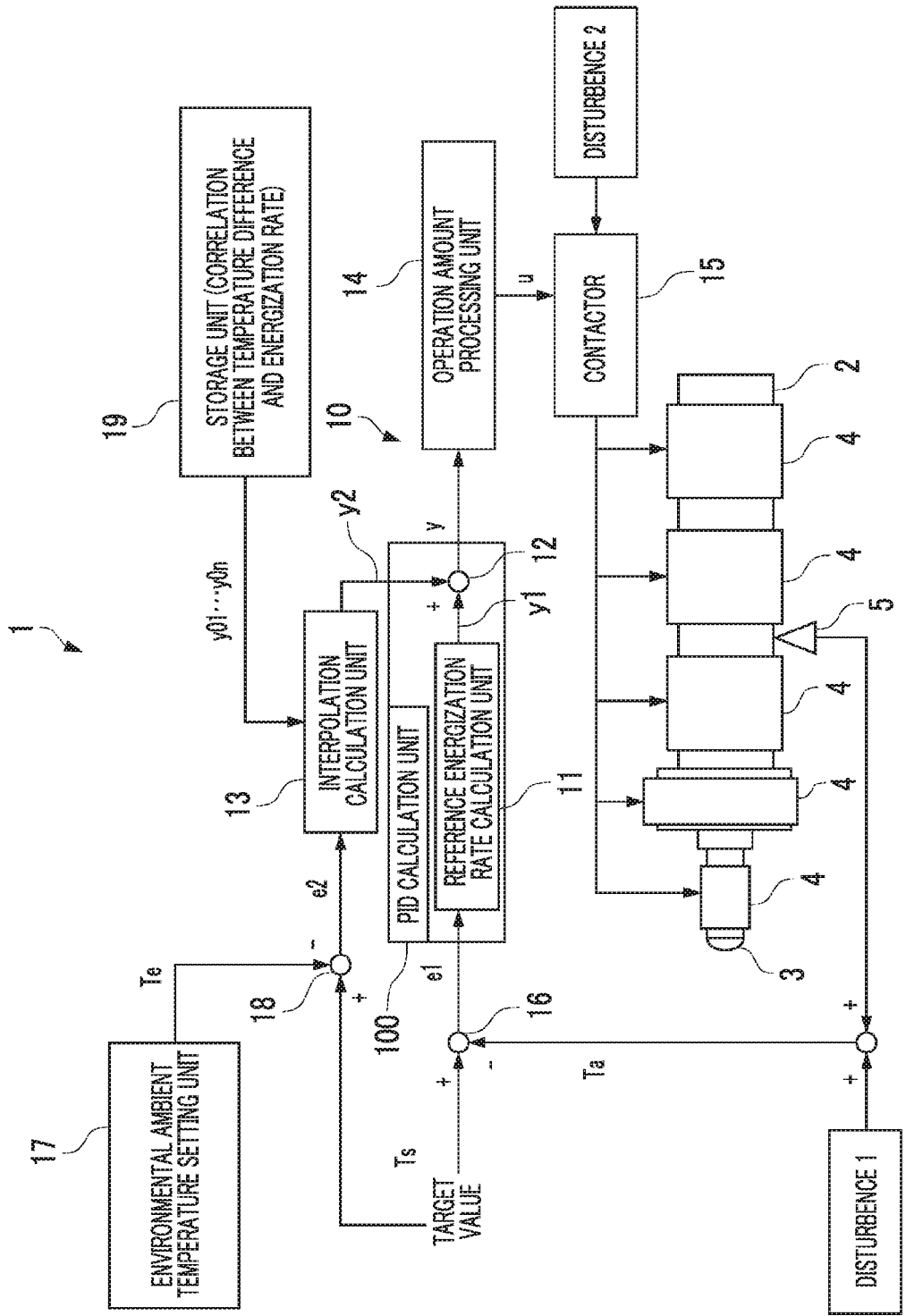
FIG. 1 is a view illustrating a temperature feedback control system of a heating barrel in an injection molding machine related to a first embodiment of the invention.

In the present embodiment, as illustrated in FIG. 1, in an injection molding machine 1 including a heating barrel 2 having a screw (not illustrated) built therein and a plurality of band-like heaters 4 wound around an outer periphery of the heating barrel 2, the temperature of the heating barrel 2 is controlled by controlling the electrical power to be supplied to the heaters 4. The heating barrel 2 has a nozzle 3 for discharging melted resin at a tip thereof, the heater 4 is also wound around an outer periphery of the nozzle 3, and is the nozzle 3 also serves as a temperature control target, similar to the heaters 4 at the outer periphery of the heating barrel 2. A temperature detection sensor 5 for measuring the temperature (actually measured temperature Ta) of the heating barrel 2 is attached to the outer periphery of the heating barrel 2.

In addition, disturbance 1 and disturbance 2 in FIG. 1 target the followings, respectively. In the present embodiment, feedback control is executed in consideration of these disturbances.

Disturbance 1: a change in an ambient temperature, a change in a molding cycle=a change in heat release amount Disturbance 2: a change in a power supply voltage=heater output varies irrespective of operation amount being constant The injection molding machine 1, as illustrated in FIG. 1, includes a feedback control system 10 for controlling the temperature of the heaters 4 by means of feedback based on PID.

The feedback control system 10 includes a reference energization rate calculation unit 11 that calculates and outputs an first energization rate y1, and an interpolation calculation unit 13 that calculates and outputs a second energization rate y2. The first energization rate y1 and the second energization rate y2 that have been output, respectively, are subjected to comparison calculation in a comparison calculation unit 12, and the corrected energization rate y is created. That is, in the first embodiment, the PID calculation unit 100 is constituted by the reference energization rate calculation unit 11 and the comparison calculation unit 12.

The operation amount processing unit 14 obtains an operation amount u in the heaters 4 by means of calculation on the basis of the corrected energization rate y.

Heater operation amount $u(J)$=control cycle $T(s)\times$ corrected energization rate $y\times$heater rating $h$ $(W)$ For example, if the control cycle T is 20 s and the heater rating h is 3 kW, the corrected energization rate y is within a range of 0 to 1. Thus, the heater operation amount reaches 0 to 60 kJ (here, every 20 s). Additionally, since the heater rating h depends on the power supply voltage, it is preferable to measure the power supply voltage always or in a predetermined cycle and correct the heater rating h and to use the corrected heater rating for derivation of the heater operation amount, in a case where the power supply voltage fluctuates.

When a contactor 15 is operated for opening and closing in accordance with the operation amount u, the contactor is controlled such that ON/OFF of energization to the heaters 4 is controlled in a constant cycle and the target temperature Ts converges to the actually measured temperature Ta of the heating barrel 2. Semiconductor switching elements, such as a solid state relay (SSR) and a solid state contactor (SSC), can also be used as alternatives of the contactor 15.

Additionally, the feedback control system 10 includes an environmental ambient temperature setting unit 17, and compares an environmental ambient temperature Te detected by the environmental ambient temperature setting unit 17 with the target temperature Ts in a second temperature difference detection unit 18, to obtain a second temperature difference e2. The interpolation calculation unit 13 acquires the second temperature difference e2, and acquires correlation data (hereinafter simply referred to as first correlation data) of a temperature difference e2n (=target temperature Tsn−ambient temperature Ten) and an energization rate stored in a storage unit 19, to collate both the second temperature and the correlation data with each other, thereby obtaining the second energization rate y2. The environmental ambient temperature Ten may fluctuate depending on the temperature of the interior of an interior where the injection molding machine 1 is placed, outdoor temperature, or the like.

Hereinafter, the first correlation data stored in the storage unit 19 will be described, and subsequently, a procedure in which the interpolation calculation unit 13 obtains the second energization rate y2 will be described.

The first correlation data are obtained in advance by actually measuring an actual energization rate y0n to be applied to the heaters 4 regarding the conditions of a plurality of (for example, two) different temperature differences (=target temperature Tsn ambient temperature Ten), and are data in which the temperature differences and the actual energization rate y0n are made to correspond to each other. That is, in the present embodiment, the first correlation data are correlation between the temperature differences and the actual energization rate under the conditions that the injection molding machine is stably maintained at the target temperature Tsn originally in an environment of the environmental ambient temperature Ten. That is, in a predetermined temperature difference, even if PID parameters change depending on a transient state in a temperature rise control process or a temperature fall control process, an energization rate obtained by the PID parameters that converge finally is acquired by experiment in advance, and is stored in the storage unit 19. The first correlation data stored in the storage unit 19 are exemplified in Table 1.

TABLE 1

| Temperature difference e2n (° C.) | 10 | ... | 100 | 130 | 180 | 250 | ... | 300 |
|---|---|---|---|---|---|---|---|---|
| Actual energization rate y0n (%) | 5 | ... | 25 | 30 | 40 | 55 | ... | 80 |

Figure 3:
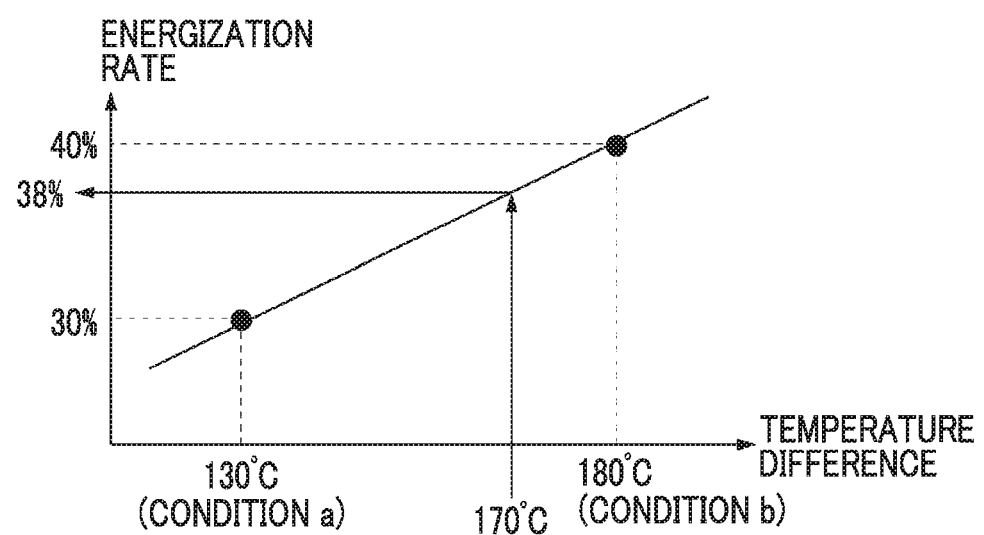
FIG. 3 is a view illustrating an example of correlation data related to the present embodiment.

Hereinafter, a specific example will be described with reference to FIG. 3.

For example, the actual energization rate y0n to be applied to the heaters 4 that are control targets is actually measured regarding two different conditions of a condition a and a condition b illustrated below. As illustrated in FIG. 3, results of the measurement are plotted on a graph in which a horizontal axis represents the temperature differences and a vertical axis represents the actual energization rate (y0n), a line segment connecting the condition a and the condition b is expressed by the following Formula (1), and this Formula (1) becomes a proportional interpolation formula of the first correlation data between a temperature difference of 130° C. and a temperature difference of 180° C. that is this example.

Target temperature $Ts1=150°$ C.

Environmental ambient temperature (temperature) $Te1=20°$ C.

Temperature difference $e21=130°$ C.

Energization rate (actual energization rate $y01$) after temperature of control target converges to 150° C.=30%   Condition a:

Target temperature $Ts2=200°$ C.

Environmental ambient temperature (temperature) $Te2=20°$ C.

Temperature difference $e22=180°$ C.

Energization rate (actual energization rate $y02$) after temperature of control target converges to 200° C.=40%   Condition b:

First Correlation Data:

$$y = (y02 - y01)/(e22 - e21) \times (e2 - e21) + 30 = \quad \text{Formula (1)}$$
$$0.2 \times (e2 - 130) + 30 (\%)$$

e2: second temperature difference

Although the interpolation formula between the temperature difference of 130° C. and the temperature difference of 180° C. is shown in the above example, interpolation formulas between other temperature differences, for example, an interpolation formula between a temperature difference of 100° C. and a temperature difference of 130° C., and an interpolation formula between a temperature difference of 180° C. and a temperature difference of 250° C. of can respectively be obtained similarly from the first correlation data stored in the storage unit 19.

In addition, it is preferable that the measurement of the actual energization rate y0n performed in order to create the first correlation data is performed on the condition of a high gain with a small gain error in order to cause convergence of the actually measured temperature Ta to the target temperature Ts with high precision.

If the above first correlation data is stored in the storage unit 19, and the ambient temperature Te detected by the environmental ambient temperature setting unit 17, the target temperature Ts, and the second temperature difference e2 in the second temperature difference detection unit 18 are the following measurement results c, the interpolation calculation unit 13 calculates the second energization rate y2 to be 38% on the basis of the first correlation data.

Target temperature $Ts=200°$ C.

Ambient temperature (temperature) $Te=30°$ C.

Second temperature difference $e2=170°$ C.

Second energization rate: $y2=0.2\times(170-130)+30=38$ (%)　　　　Measurement results c:

The feedback control system 10 obtains the corrected energization rate y by applying limitation caused by the second energization rate y2 obtained by the interpolation calculation unit 13, with the first energization rate y1 obtained by the reference energization rate calculation unit 11 as a reference. More specifically, the corrected energization rate y compares the first energization rate y1 with the second energization rate y2, and is set in accordance with the following first, second, and third conditions. Here, α1 and β1 are respectively predetermined management allowable values that are set in advance. In addition, the corrected energization rate y may add limitation in the calculation of obtaining the PID parameters from which the first energization rate y1 is obtained.

$y2-\alpha1 \leq y1 \leq y2+\beta1$

Corrected energization rate $y=y1$　　　　First condition:

$y1<y2-\alpha1$

Corrected energization rate $y=y2-\alpha1$　　　　Second condition:

$y2+\beta1<y1$

Corrected energization rate $y=y2+\beta1$　　　　Third condition:

Meanwhile, generally, the feedback control system 10 compares the actually measured temperature Ta measured by the temperature detection sensor 5 with the target temperature Ts in a first temperature difference detection unit 16, to obtain a first temperature difference e1. The reference energization rate calculation unit 11 acquires the first temperature difference e1, and obtains the first energization rate y1 required to solve the first temperature difference e1.

The reference energization rate calculation unit 11 executes a PID control basic formula shown by the following Formula (2), and adds and synthesizes three actions including a proportional action (P action) in which a correction amount that is proportional to a current first temperature difference e1 is given, an integral action (I action) in which a correction amount proportional to a cumulative value of the past first temperature difference e1 is given, and a derivative action (D action) in which the first temperature difference e1 increasing d or decreasing, but a correction amount proportional to the magnitude of the increasing or decreasing tendency is given, and obtains the first energization rate y1.

$y1_n=1/P(e1_n+1/Ti\cdot T\cdot\Sigma_{x=0\rightarrow n}e1_x+Td/T(e1_n-e1_{n-1}))$　　　　Formula (2)

P, Ti, Td: PID parameters, T: Control cycle

In this case, supposing a case where the target temperature Ts and the actually measured temperature Ta coincide (converge) with each other and there is no disturbance, states where it can be determined that convergence has been made are at least temperature differences $e1_n=0$ and $e1_{n-1}=0$ in n that is in the newest state and n−1 immediately before n, and temperature differences $e1_0 - e1_{n-2} \neq 0$ in 0 to n−2 before n−1. Thus, items other than integral items In Formula (1) becomes zero, and satisfies the following Formula (3). In the calculation of obtaining the corrected energization rate y in a convergence state from this, it turns out that an integrated value is dominant.

$y1_n=1/P(1/Ti\cdot T\cdot\Sigma_{x=0\rightarrow n-2}e1_x)$　　　　Formula (3)

Therefore, the effects of the invention are obtained by obtaining an upper limit and a lower limit of an integral quantity $\Sigma_{x=0\rightarrow n}e1_x$ corresponding to y2−α1 and y2+β1 by means of a certain known method, thereby deriving y1, on the basis of the temperature difference e2n, and the second energization rate y2 obtained using the first correlation data of the second temperature difference e2 stored in the storage unit 19 and an energization rate.

[Effects]

According to the injection molding machine 1 described above, the following effects are exhibited.

Although the injection molding machine 1 controls the temperature of the heater 4 from the corrected energization rate y limited and obtained by the second energization rate y2 based on the second temperature difference e2 between the ambient temperature Te and the actually measured temperature Ta with the first energization rate y1 as a reference, the second energization rate y2 adapts to the surrounding environment where injection molding is performed. Hence, the injection molding machine 1 can cause the temperature of the heaters 4 to quickly converge to the target temperature Ts with high precision by adopting the corrected energization rate y.

Also, since the second energization rate y2 is calculated by the proportional interpolation using the first correlation data that is obtained in advance, calculation processing time is short, ends and this also contributes to causing the temperature of the heaters 4 to quickly converge to the target temperature Ts.

Next, in the feedback control, if the actually measured temperature Ta approximates the target temperature Ts, the first energization rate y1 becomes small, and the actually measured temperature Ta falls within a range of the gain error. However, if the actually measured temperature Ta tends to make an error from the target temperature Ts small, it is necessary to enlarge a gain. However, and if the gain is enlarged, overshoot or undershoot is apt to become large.

In the present embodiment, the corrected energization rate y can be regarded as being offset by the second energization rate y2 with respect to the first energization rate y1. For this reason, even in a case where the first energization rate y1 obtained by the PID control when the actually measured temperature Ta approximates the target temperature Ts becomes small, the corrected energization rate y has the operation amount of the second energization rate y2 equivalent to the offset optimal for the ambient temperature Te. However, since the second energization rate y2 is an energization rate with which temperature can be maintained at a target value in balance with the heat release of the heaters 4, the heaters 4 precisely converges to the target temperature Ts even if the gain is not enlarged.

In the present embodiment, the sampling timing of the actually measured temperature Ta and the ambient temperature Te are arbitrary, and both the temperatures may coincide with each other or may be different from each other. In a case where these temperatures are different from each other, the sampling timing of the ambient temperature Te may be longer or may be shorter than the actually measured temperature Ta.

Additionally, the application of the first energization rate y1 calculated on the basis of the temperature difference between the target temperature Ts and the ambient temperature Te to control may be performed simultaneously with the calculation of the feedback control, at an interval longer than an calculation timing, or at an independent timing without correlation with the calculation timing.

Additionally, the PID parameters for obtaining the first energization rate y1 may be switched in each step or may not be switched. The step herein means a step in one cycle (one shot) of the injection molding, and means a series of steps, such as a temperature raising step, a heat keeping step, and a temperature raising step.

Additionally, the second energization rate y2 can be switched in accordance with the measured ambient temperature Te at each sampling timing of the ambient temperature Te. For example, provided that a fluctuation width ΔTe of the ambient temperature Te is less than a threshold, the existing second energization rate y2 continues to be used or the second old energization rate y2 continues to be used within a predetermined time.

Moreover, heat release amount resistance is determined by a difference between the surface temperature of the heaters 4 and its environmental ambient temperature. The heat release amount is determined by this heat release amount resistance and the surface temperature of the heaters 4. Therefore, if the surface temperature of the heaters 4 is measured, it is not necessary to use known correlation data. That is, the heat release amount from the heater 4 may be derived according to a mathematical formula by obtaining an energization rate enough to complement the amount of heat released not through experiment but under the assumption of a heat transfer model on a desk, and an energization rate for causing the heaters 4 to generate the amount of heat equivalent to the heat release amount may be stored in a control device by preparing a correlation formula of "the difference between the surface temperature of the heaters and the environmental ambient temperature" and the energization rate.

Second Embodiment

Figure 4:
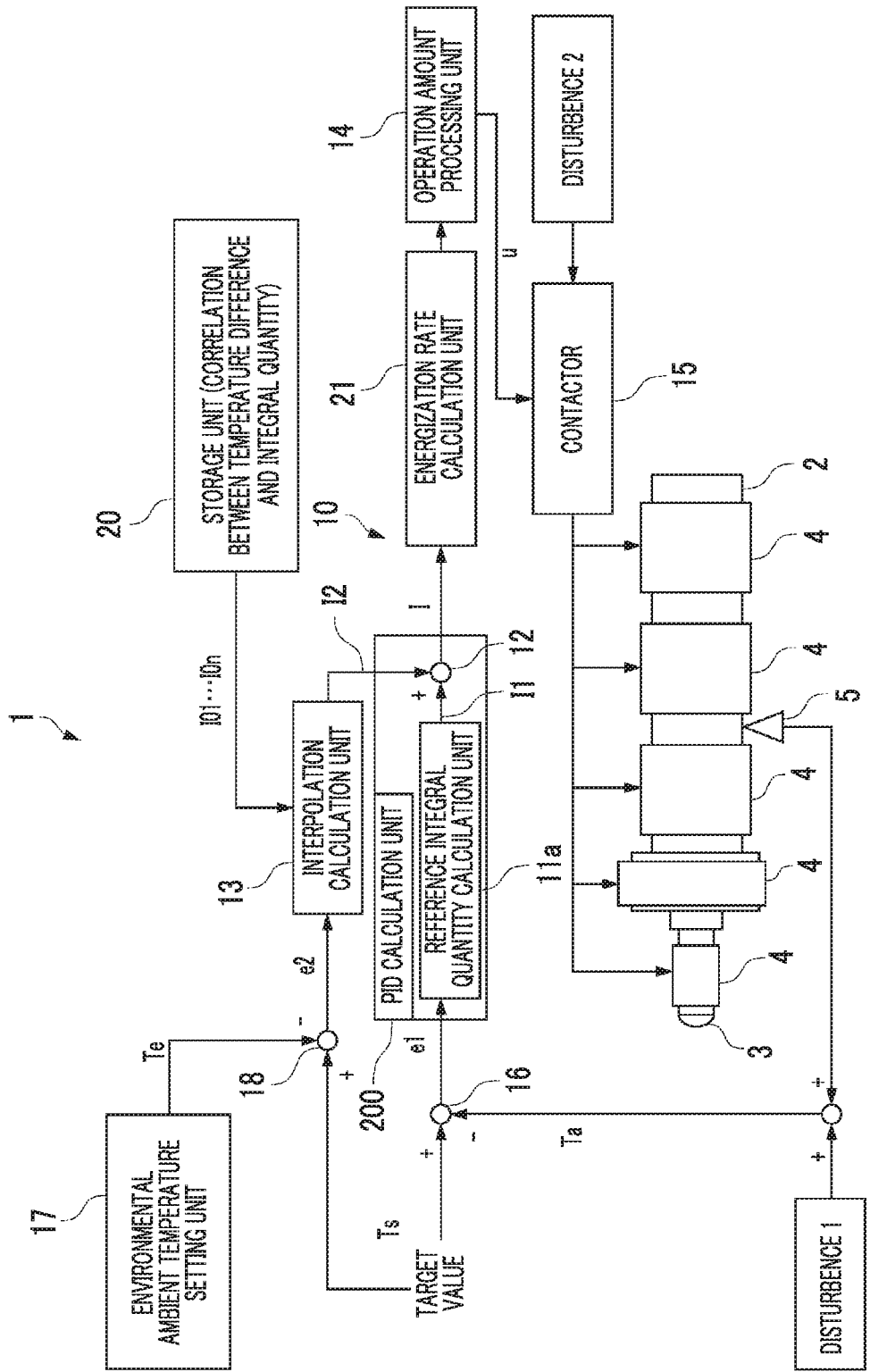
FIG. 4 is a view illustrating a temperature feedback control system of a heating barrel in an injection molding machine related to a second embodiment of the invention.

Next, a second embodiment of the invention will be described with reference to FIG. 4.

In the second embodiment, correlation data (simply referred to as second correlation data) of the temperature difference e2n (=target temperature Tsn−ambient temperature Ten) and an integral quantity I0n is stored in a storage unit 20, and the integral quantity I0n is used as an alternative of the actual energization rate y0n of the first correlation data of the first embodiment. Similar to the first embodiment, the second correlation data can be obtained by extracting the actually calculated integral quantity I0n regarding two different conditions, and similar to that illustrated in FIG. 3, plotting results of the extraction on a graph in which a horizontal axis represents the temperature differences and a vertical axis represents the actual integral quantity (I0n). Hereinafter, the injection molding machine 1 of the second embodiment will be described mainly about differences from the first embodiment.

The feedback control system 10 of the injection molding machine 1 includes a reference integral quantity calculation unit 11a that calculates and outputs a first integral quantity I1, and the interpolation calculation unit 13 that calculates and outputs an second integral quantity I2. The first integral quantity I1 and the second integral quantity I2 that have been output, respectively, are subjected to the comparison calculation in the comparison calculation unit 12, and the corrected integral quantity I is created. The first integral quantity I1 is based on the first temperature difference e1 between the actually measured temperature Ta and the target temperature Ts.

The interpolation calculation unit 13 acquires the second temperature difference e2, and acquires the second correlation data stored in the storage unit 20 to collate both the second temperature and the second correlation data with each other, thereby obtaining the corrected integral quantity I.

That is, in the second embodiment, a PID calculation unit 200 is constituted by the reference integral quantity calculation unit 11a and the comparison calculation unit 12.

An energization rate calculation unit 21 obtains the corrected energization rate y by means of calculation on the basis of the corrected integral quantity I, and the operation amount processing unit 14 obtains the operation amount u in the heaters 4 by means of calculation on the basis of the corrected energization rate y, similar to the first embodiment.

Figure 2A:
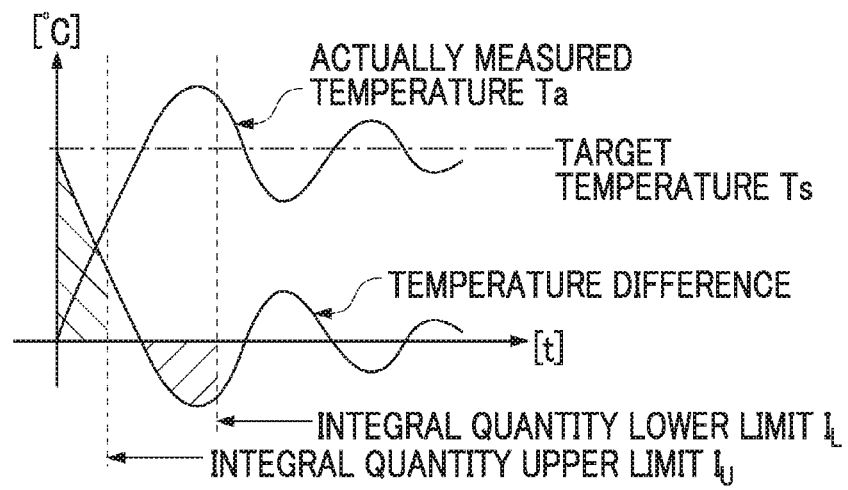
FIG. 2A is a view illustrating an I action of PID control related to the present embodiment in which limitation is applied to the integral quantity in the I action.

The feedback control system 10 obtains the corrected integral quantity I by applying limitation caused by the second integral quantity I2 obtained by the interpolation calculation unit 13, with the first integral quantity I1 obtained by the reference integral quantity calculation unit 11a as a reference. More specifically, as illustrated in FIG. 2A, the first energization rate y1 is obtained by setting an integral quantity to be used for the calculation of the first energization rate y1 to $I_U$ without performing further integration in a case where an integral quantity exceeds an upper limit $I_U$ of the integral quantity and by setting the integral quantity to $I_L$ without performing further integration, similarly, even in a case where the integral amount is less than a lower limit $I_L$ of the integral quantity. Specifically, the corrected integral quantity I is set in accordance with the following first, second, and third conditions. Here, α2 and β2 are respectively predetermined management allowable values that are set in advance and consist of positive numbers.

$$I_L = I2 - \alpha2 \leq I2 \leq I2 + \beta2 = I_U$$

| | |
|---|---:|
| Integral quantity $I = I1$ | First condition: |
| $I1 < I2 - \alpha2 = I_L$ | |
| Integral quantity $I = I2 - \alpha2 = I_L$ | Second condition: |
| $I_U = I2 + \beta2 < I1$ | |
| Integral quantity $I = I2 + \beta2 = I_U$ | Third condition: |

In addition, FIG. 2A illustrates that integration is executed in a region where left hatching is performed the upper limit $I_U$ interposed therebetween, and integration is stopped in a right white region. Additionally, FIG. 2A illustrates that integration is executed in a region where left hatching is performed the lower limit $I_L$ interposed therebetween, and integration is stopped in a right white region.

Figure 2B:
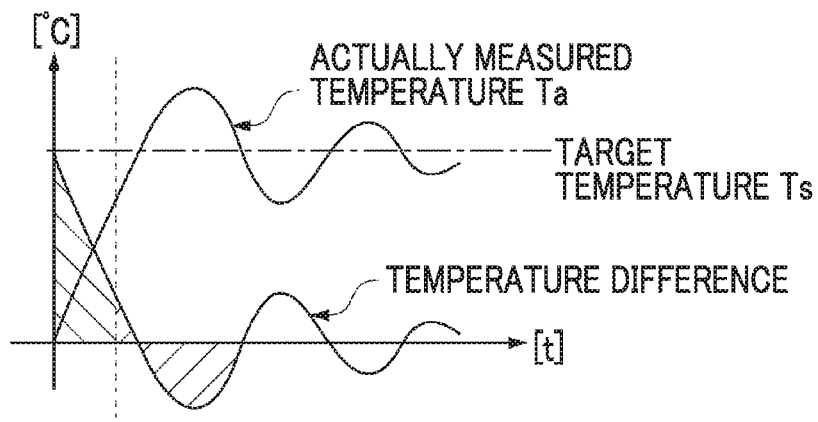
FIG. 2B is a view illustrating an example in which limitation is not applied to the integral quantity in the I action.

As described above, since the reference integral quantity calculation unit 11a applies limitation to the integral quantity in the I action, convergence to the target temperature Ts can be made quickly. As comparison, an example in which limitation is not applied to the integral quantity in the I action is illustrated in FIG. 2B.

In addition, although suitable values of the upper limit $I_U$ and the lower limit $I_L$ should be set such that convergence of temperature is made quickly, FIG. 2A illustrate the concept of the upper limit $I_U$ and the lower limit $I_L$, and does not illustrate the suitable values.

The injection molding machine 1 of the second embodiment can cause the temperature of the heaters 4 to quickly converge to the target temperature Ts with high precision, similar to the first embodiment, and even if the gain is not enlarged, the temperature of the heaters 4 precisely converges to the target temperature Ts.

Additionally, the corrected energization rate y may limit a range where any of the PID parameters can be acquired in the calculation of obtaining the PID parameters. However, as described above, in the convergence state, the first energization rate y1 depends on the corrected integral quantity I. Thus, it is preferable to limit only the value of I without limiting PD in obtaining a high transition response.

Although the invention has been described above on the basis of the preferred embodiments, changes shown as follows can also be accompanied without departing from the spirit of the invention.

The invention claimed is:

1. A temperature control method of heating an injection molding heating target with a heater, detecting the temperature of the heating target, and controlling electrical power supplied to the heater by means of a feedback control system including PID control such that a detected, actually measured temperature Ta reaches a preset target temperature Ts, the method comprising:
   a step (A) of obtaining, by means of the PID control, a first energization rate y1 based on a first temperature difference e1 between the actually measured temperature Ta and the target temperature Ts;
   a step (B) of obtaining a second energization rate y2 based on a second temperature difference e2 between an ambient temperature Te of an environment in which the heating target is disposed and the target temperature Ts;
   a step (C) of obtaining a corrected energization rate y by a comparison of the first energization rate y1 and the second energization rate y2; and
   a step (D) of controlling the electrical power supplied to the heater using the corrected energization rate y,
   wherein in step (C), the corrected energization rate y is set to one of the following first, second, and third conditions on the basis of the comparison:

$y=y1$;                             first condition:

$y=y2-\alpha 1$; and                 second condition:

$y=y2+\beta 1$,                      third condition:

where $\alpha 1$ and $\beta 1$ are respectively predetermined management allowable values that are set in advance and consist of positive numbers, and
   wherein the comparison is performed such that the corrected energization rate y:
   is set to the first condition in the case of $y2-\alpha 1 \leq y1 \leq y2+\beta 1$;
   is set to the second condition in the case of $y1<y2-\alpha 1$; and
   is set to the third condition in the case of $y2+\beta 1<y1$.

2. The temperature control method according to claim 1, wherein in step (B), the second energization rate y2 is obtained on the basis of previously acquired correlation data of a temperature difference e2n between an environmental ambient temperature Ten and a target temperature Tsn and of an energization rate required to solve the temperature difference e2n.

3. The temperature control method according to claim 1, wherein the heating target is a heating barrel of an injection molding machine.

4. A temperature control device that heats an injection molding heating target with a heater, detects the temperature of the heating target, and controls electrical power supplied to the heater by means of a feedback control system including PID control such that a detected, actually measured temperature Ta reaches a preset target temperature Ts, the device comprising:
   a reference energization rate calculation unit that creates, by means of the PID control, a first energization rate y1 based on a first temperature difference e1 between the actually measured temperature Ta and the target temperature Ts;
   an interpolation calculation unit that creates a second energization rate y2 based on a second temperature difference e2 between an ambient temperature Te of an environment in which the heating target is disposed and the target temperature Ts;
   a comparison calculation unit that obtains a corrected energization rate y by a comparison of the first energization rate y1 and the second energization rate y2; and
   an operation amount processing unit that controls the electrical power supplied to the heater using the corrected energization rate y obtained by the comparison calculation unit,
   wherein the comparison calculation unit sets the corrected energization rate y to one of the following first, second, and third conditions on the basis of the comparison;

$y=y1$;                             first condition:

$y=y2-\alpha 1$; and                 second condition:

$y=y2+\beta 1$,                      third condition:

where $\alpha 1$ and $\beta 1$ are respectively predetermined management allowable values that are set in advance and consist of positive numbers, and
   wherein the comparison is performed such that the corrected energization rate y:
   is set to the first condition in the case of $y2-\alpha 1 \leq y1 \leq y2+\beta 1$;
   is set to the second condition in the case of $y1<y2-\alpha 1$; and
   is set to the third condition in the case of $y2+\beta 1<y1$.

5. The temperature control device according to claim 4, further comprising:
   a storage unit that stores previously acquired correlation data of a temperature difference e2n between an environmental ambient temperature Ten and a target temperature Tsn and of an energization rate required to solve the temperature difference e2n,
   wherein the interpolation calculation unit obtains the second energization rate y2 on the basis of the ambient temperature Te and the correlation data acquired from the storage unit.

6. The temperature control device according to claim 4, wherein the heating target is a heating barrel of an injection molding machine.

\* \* \* \* \*